United States Patent
Shimada et al.

(10) Patent No.: US 8,555,112 B2
(45) Date of Patent: Oct. 8, 2013

(54) METHOD AND APPARATUS FOR ESTIMATING CANDIDATE CAUSE

(75) Inventors: Kuniaki Shimada, Kawasaki (JP); Yukihiro Watanabe, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 402 days.

(21) Appl. No.: 12/973,483

(22) Filed: Dec. 20, 2010

(65) Prior Publication Data

US 2011/0320874 A1    Dec. 29, 2011

(30) Foreign Application Priority Data

Dec. 24, 2009    (JP) ................................. 2009-292826

(51) Int. Cl.
*G06F 11/00*    (2006.01)

(52) U.S. Cl.
USPC ................. 714/26; 714/25; 714/37; 714/38.1; 714/46; 717/125

(58) Field of Classification Search
USPC .................. 714/25, 26, 31, 38.1, 467, 37, 46; 717/125
See application file for complete search history.

(56) References Cited

U.S. PATENT DOCUMENTS

| | | | | |
|---|---|---|---|---|
| 6,012,152 | A * | 1/2000 | Douik et al. ..................... | 714/26 |
| 7,213,174 | B2 * | 5/2007 | Dahlquist ........................ | 714/37 |
| 7,379,846 | B1 * | 5/2008 | Williams et al. .............. | 702/185 |
| 7,856,575 | B2 * | 12/2010 | Bock et al. ....................... | 714/26 |
| 2004/0073403 | A1 * | 4/2004 | Hart et al. ....................... | 702/183 |
| 2008/0172574 | A1 * | 7/2008 | Fisher ............................. | 714/25 |

FOREIGN PATENT DOCUMENTS

| | | |
|---|---|---|
| JP | 5-143341 A | 6/1993 |
| JP | 2007-80040 A | 3/2007 |
| JP | 2009-110293 A | 5/2009 |

* cited by examiner

*Primary Examiner* — Joshua P Lottich
(74) *Attorney, Agent, or Firm* — Fujitsu Patent Center

(57) ABSTRACT

A method for estimating a candidate cause in a failure occurred in an information processing apparatus by a computer, the method includes retrieving, by the computer, a first set of incident information from a data storage region on the basis of failure symptom data which is set on the computer, the data storage region storing incident information, each piece of the incident information including failure symptom data, first cause data of a positive judgment result of a cause in the failure, and second cause data of a negative judgment result of the cause in the failure, each of the first set including the failure symptom data identical to the set failure symptom data.

15 Claims, 18 Drawing Sheets

| SYMPTOM | REJECTED HYPOTHESIS [1] | REJECTED HYPOTHESIS [2] | CAUSE |
|---|---|---|---|
| CONNECTION WITH A CLIENT IS INTERMITTENT | SHORTAGE OF WEB SERVER DISK CAPACITY | LOAD BALANCER SETTING ERROR | WAITING FOR A RESOURCE TO BE RELEASED OWING TO SHORTAGE OF SERVER PORT RESOURCES |

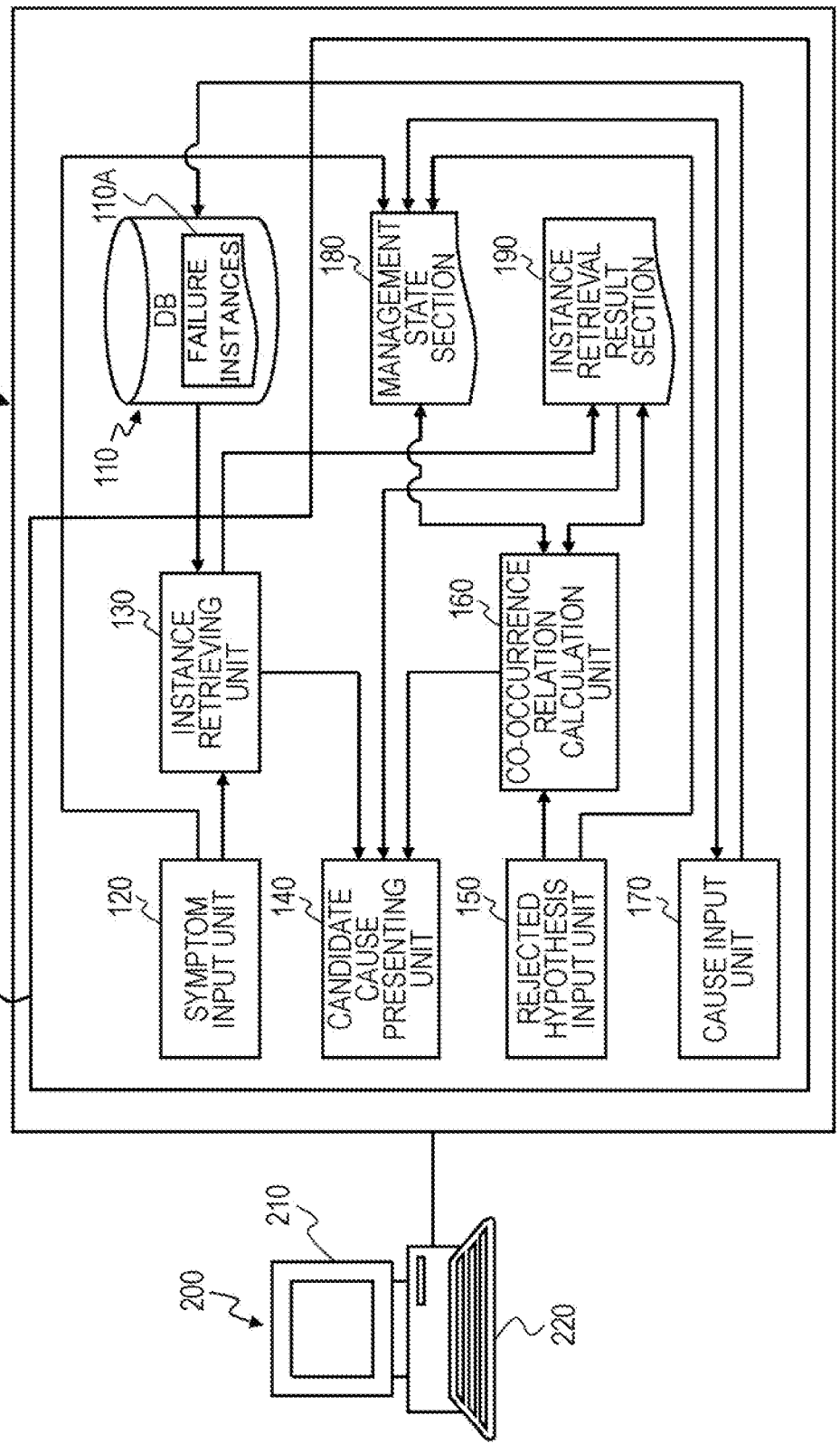

FIG. 2  110A

| ID | SYMPTOM | CAUSE HYPOTHESIS [1] | CAUSE HYPOTHESIS [2] | CAUSE |
|---|---|---|---|---|
| 1 | COMMUNICATION DISABLED | | | ABNORMAL POWER SUPPLY UNIT |
| 2 | CONNECTION WITH A CLIENT IS INTERMITTENT | LDAP SERVER ERROR | LOAD BALANCER SETTING ERROR | SHORTAGE OF WEB SERVER DISK CAPACITY |
| 3 | CONNECTION WITH A CLIENT IS INTERMITTENT | SHORTAGE OF WEB SERVER DISK CAPACITY | WAITING FOR A RESOURCE TO BE RELEASED OWING TO SHORTAGE OF SERVER PORT RESOURCES | LOAD BALANCER SETTING ERROR |
| 4 | CONNECTION WITH A CLIENT IS INTERMITTENT | WAITING FOR A RESOURCE TO BE RELEASED OWING TO SHORTAGE OF SERVER PORT RESOURCES | | LDAP SERVER ERROR |
| 5 | CONNECTION WITH A CLIENT IS INTERMITTENT | LOAD BALANCER SETTING ERROR | SHORTAGE OF WEB SERVER DISK CAPACITY | WAITING FOR A RESOURCE TO BE RELEASED OWING TO SHORTAGE OF SERVER PORT RESOURCES |
| 6 | COMMUNICATION DISABLED | | | ABNORMAL POWER SUPPLY UNIT |
| 7 | CONNECTION WITH A CLIENT IS INTERMITTENT | SHORTAGE OF WEB SERVER DISK CAPACITY | | LOAD BALANCER SETTING ERROR |
| 8 | CONNECTION WITH A CLIENT IS INTERMITTENT | LDAP SERVER ERROR | | SHORTAGE OF WEB SERVER DISK CAPACITY |
| 9 | CONNECTION WITH A CLIENT IS INTERMITTENT | | | LDAP SERVER ERROR |
| 10 | CONNECTION WITH A CLIENT IS INTERMITTENT | WAITING FOR A RESOURCE TO BE RELEASED OWING TO SHORTAGE OF SERVER PORT RESOURCES | LOAD BALANCER SETTING ERROR | SHORTAGE OF WEB SERVER DISK CAPACITY |
| ... | ...... | ....... | ....... | ...... |

| SYMPTOM | REJECTED HYPOTHESIS [1] | REJECTED HYPOTHESIS [2] | CAUSE |
|---|---|---|---|
| | | | |

| ID | SYMPTOM | CAUSE HYPOTHESIS [1] | CAUSE HYPOTHESIS [2] | CAUSE |
|---|---|---|---|---|
| | | | | |

| ID | SYMPTOM | CAUSE HYPOTHESIS [1] | CAUSE HYPOTHESIS [2] | CAUSE |
|---|---|---|---|---|
| 2 | CONNECTION WITH A CLIENT IS INTERMITTENT | LDAP SERVER ERROR | LOAD BALANCER SETTING ERROR | SHORTAGE OF WEB SERVER DISK CAPACITY |
| 3 | CONNECTION WITH A CLIENT IS INTERMITTENT | SHORTAGE OF WEB SERVER DISK CAPACITY | WAITING FOR A RESOURCE TO BE RELEASED OWING TO SHORTAGE OF SERVER PORT RESOURCES | LOAD BALANCER SETTING ERROR |
| 4 | CONNECTION WITH A CLIENT IS INTERMITTENT | WAITING FOR A RESOURCE TO BE RELEASED OWING TO SHORTAGE OF SERVER PORT RESOURCES | | LDAP SERVER ERROR |
| 5 | CONNECTION WITH A CLIENT IS INTERMITTENT | LOAD BALANCER SETTING ERROR | SHORTAGE OF WEB SERVER DISK CAPACITY | WAITING FOR A RESOURCE TO BE RELEASED OWING TO SHORTAGE OF SERVER PORT RESOURCES |
| 7 | CONNECTION WITH A CLIENT IS INTERMITTENT | SHORTAGE OF WEB SERVER DISK CAPACITY | | LOAD BALANCER SETTING ERROR |
| 8 | CONNECTION WITH A CLIENT IS INTERMITTENT | LDAP SERVER ERROR | | SHORTAGE OF WEB SERVER DISK CAPACITY |
| 9 | CONNECTION WITH A CLIENT IS INTERMITTENT | | | LDAP SERVER ERROR |
| 10 | CONNECTION WITH A CLIENT IS INTERMITTENT | WAITING FOR A RESOURCE TO BE RELEASED OWING TO SHORTAGE OF SERVER PORT RESOURCES | LOAD BALANCER SETTING ERROR | SHORTAGE OF WEB SERVER DISK CAPACITY |

Candidate causes are listed.
Select a candidate cause and select an investigation result.

| Priority Level | Number of Instances | Candidate Cause | Investigation |
|---|---|---|---|
| 1 | 3 | Shortage of web server disk capacity | ◉ |
| 2 | 2 | Load balancer setting error | ◯ |
| 3 | 2 | LDAP server error | ◯ |
| 4 | 1 | Waiting for a resource to be released owing to shortage of server port resources | ◯ |

Investigation Result
◉ Solved   ◯ Unsolved

| ID | SYMPTOM | CAUSE HYPOTHESIS [1] | CAUSE HYPOTHESIS [2] | CAUSE |
|---|---|---|---|---|
| 3 | CONNECTION WITH A CLIENT IS INTERMITTENT | SHORTAGE OF WEB SERVER DISK CAPACITY | WAITING FOR A RESOURCE TO BE RELEASED OWING TO SHORTAGE OF SERVER PORT RESOURCES | LOAD BALANCER SETTING ERROR |
| 5 | CONNECTION WITH A CLIENT IS INTERMITTENT | LOAD BALANCER SETTING ERROR | SHORTAGE OF WEB SERVER DISK CAPACITY | WAITING FOR A RESOURCE TO BE RELEASED OWING TO SHORTAGE OF SERVER PORT RESOURCES |
| 7 | CONNECTION WITH A CLIENT IS INTERMITTENT | SHORTAGE OF WEB SERVER DISK CAPACITY | | LOAD BALANCER SETTING ERROR |

Candidate causes are listed.
Select a candidate cause and select an investigation result.

| Priority Level | Number of Instances | Candidate Cause | Investigation |
|---|---|---|---|
| 1 | 2 | Load balancer setting error | ⊙ |
| 2 | 1 | Waiting for a resource to be released owing to shortage of server port resources | ○ |

Investigation Result
○ Solved   ⊙ Unsolved

Candidate causes are listed.
Select a candidate cause and select an investigation result.

| Priority Level | Number of Instances | Candidate Cause | Investigation |
|---|---|---|---|
| 1 | 1 | Waiting for a resource to be released owing to shortage of server port resources | ⊙ |

Investigation Result
○ Solved  ⊙ Unsolved

| SYMPTOM | REJECTED HYPOTHESIS [1] | REJECTED HYPOTHESIS [2] | CAUSE |
|---|---|---|---|
| CONNECTION WITH A CLIENT IS INTERMITTENT | SHORTAGE OF WEB SERVER DISK CAPACITY | LOAD BALANCER SETTING ERROR | WAITING FOR A RESOURCE TO BE RELEASED OWING TO SHORTAGE OF SERVER PORT RESOURCES |

| ID | SYMPTOM | CAUSE HYPOTHESIS [1] | CAUSE HYPOTHESIS [2] | CAUSE |
|---|---|---|---|---|
| 1 | COMMUNICATION DISABLED | | | ABNORMAL POWER SUPPLY UNIT |
| 2 | CONNECTION WITH A CLIENT IS INTERMITTENT | LDAP SERVER ERROR | LOAD BALANCER SETTING ERROR | SHORTAGE OF WEB SERVER DISK CAPACITY |
| 3 | CONNECTION WITH A CLIENT IS INTERMITTENT | SHORTAGE OF WEB SERVER DISK CAPACITY | WAITING FOR A RESOURCE TO BE RELEASED OWING TO SHORTAGE OF SERVER PORT RESOURCES | LOAD BALANCER SETTING ERROR |
| 4 | CONNECTION WITH A CLIENT IS INTERMITTENT | WAITING FOR A RESOURCE TO BE RELEASED OWING TO SHORTAGE OF SERVER PORT RESOURCES | | LDAP SERVER ERROR |
| 5 | CONNECTION WITH A CLIENT IS INTERMITTENT | LOAD BALANCER SETTING ERROR | SHORTAGE OF WEB SERVER DISK CAPACITY | WAITING FOR A RESOURCE TO BE RELEASED OWING TO SHORTAGE OF SERVER PORT RESOURCES |
| 6 | COMMUNICATION DISABLED | | | ABNORMAL POWER SUPPLY UNIT |
| 7 | CONNECTION WITH A CLIENT IS INTERMITTENT | SHORTAGE OF WEB SERVER DISK CAPACITY | | LOAD BALANCER SETTING ERROR |
| 8 | CONNECTION WITH A CLIENT IS INTERMITTENT | LDAP SERVER ERROR | | SHORTAGE OF WEB SERVER DISK CAPACITY |
| 9 | CONNECTION WITH A CLIENT IS INTERMITTENT | | | LDAP SERVER ERROR |
| 10 | CONNECTION WITH A CLIENT IS INTERMITTENT | WAITING FOR A RESOURCE TO BE RELEASED OWING TO SHORTAGE OF SERVER PORT RESOURCES | LOAD BALANCER SETTING ERROR | SHORTAGE OF WEB SERVER DISK CAPACITY |
| 11 | CONNECTION WITH A CLIENT IS INTERMITTENT | SHORTAGE OF WEB SERVER DISK CAPACITY | LOAD BALANCER SETTING ERROR | WAITING FOR A RESOURCE TO BE RELEASED OWING TO SHORTAGE OF SERVER PORT RESOURCES |

METHOD AND APPARATUS FOR ESTIMATING CANDIDATE CAUSE

CROSS-REFERENCE TO RELATED APPLICATION

This application is based upon and claims the benefit of priority of the prior Japanese Patent Application No. 2009-292826 filed on Dec. 24, 2009, the entire contents of which are incorporated herein by reference.

FIELD

The embodiments discussed herein are related to a method and an apparatus for extracting a candidate cause in the failure occurred in the information processing apparatus.

BACKGROUND

To manage the failures in an information system, a technique has been proposed in which failure instances each associating the symptom of an actual failure with the cause of the failure are stored in a database, and in accordance with the symptom of a failure, candidate causes are retrieved from the database and displayed. In this proposed technique, an index for determining the order in which the causes are to be investigated is also displayed by assigning a priority level to each of the candidate causes in accordance with descending order of the number of failure instances associated with the candidate cause.

However, investigating the causes in descending order of the number of instances of the failure is not necessarily the best way. Hence, an operation manager with insufficient skills to isolate the cause may investigate causes which an operation manager with high skills would skip investigating, resulting in a possible delay in recovery from the failure.

SUMMARY

According to an aspect of an embodiment, a method for estimating a candidate cause in a failure occurred in an information processing apparatus by a computer, the method includes retrieving, by the computer, a first set of incident information from a data storage region on the basis of failure symptom data which is set on the computer, the data storage region storing incident information, each piece of the incident information including failure symptom data, first cause data of a positive judgment result of a cause in the failure, and second cause data of a negative judgment result of the cause in the failure, each of the first set including the failure symptom data identical to the set failure symptom data, extracting, by the computer, a second set of incident information from the first set on the basis of cause data which is set on the computer, each piece of the second set including the second cause data identical to the set cause data, and outputting, by the computer, the first cause data included in the second set as candidate cause data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram illustrating an example failure management apparatus according to the present embodiment;

FIG. 2 is an explanatory diagram illustrating a data structure of failure instances;

FIG. 4 is an explanatory diagram illustrating a data structure of a management state section;

FIG. 5 is an explanatory diagram illustrating a data structure of an instance retrieval result section;

FIG. 14 is an explanatory diagram illustrating an instance retrieval result section in the initial state where failure instances have been stored;

FIG. 15 is an explanatory diagram illustrating a candidate cause listing screen displayed first;

FIG. 17 is an explanatory diagram illustrating an instance retrieval result section where failure instances have been narrowed down;

FIG. 18 is an explanatory diagram illustrating a candidate cause listing screen displayed after failure instances have been narrowed down;

FIG. 21 is an explanatory diagram illustrating a candidate cause listing screen displayed after failure instances have been narrowed down;

FIG. 22 is an explanatory diagram illustrating a management state section where a cause has been stored; and FIG. 23 is an explanatory diagram illustrating a DB where a failure instance has been added.

DESCRIPTION OF EMBODIMENTS

Figure 3:
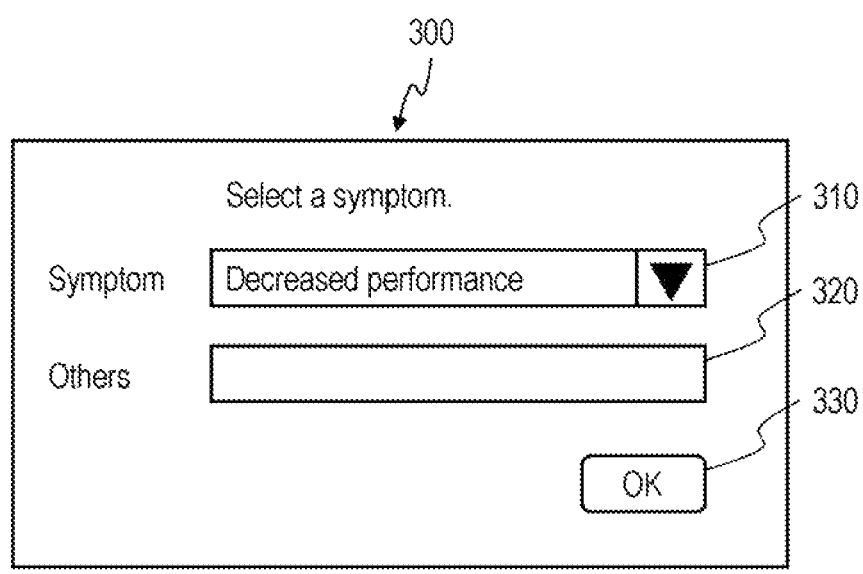
FIG. 3 is an explanatory diagram illustrating a symptom input screen.

Hereinafter, the present technique is described in detail with reference to the attached drawings.

FIG. 1 illustrates an example failure management apparatus according to the present technique.

A failure management apparatus 100, which is configured with a computer system, is connected via a local area network (LAN) to a console 200 that is operated by an operation manager, for example. The console 200 includes a display unit 210, such as a cathode ray tube (CRT) or a liquid crystal display (LCD), and an input unit 220, such as a keyboard or a mouse.

The failure management apparatus 100 includes a processor 101 and a database (DB) 110 as an example of a data storage region. The database 110 stores failure instances 110A of an information system. Referring to FIG. 2, the failure instances 110A are records each associating identification (ID), the symptom of a failure, a plurality of cause hypotheses that are assumed to be the causes of the failure, and the cause of the failure with one another. Here, the DB 110 stores the failure instances 110A that each describes the co-occurrence relations (correlations) between the cause hypotheses and the cause. Note that the number of the cause hypotheses of the failure instance 110A is not limited to two as illustrated in FIG. 2, and may be three or more (this is also true elsewhere).

In the failure management apparatus 100, a symptom input unit 120, an instance retrieving unit 130, a candidate cause presenting unit 140, a rejected hypothesis input unit 150, a co-occurrence relation calculation unit 160, and a cause input unit 170 are realized by causing the processor 101 to execute a failure management program. Here, the failure management program is installed in a storage, such as a hard disk, from a computer readable storage medium, such as a compact disc read-only memory (CD-ROM) or a digital versatile disc read-only memory (DVD-ROM), using a publicly known method.

The symptom input unit 120 makes the display unit 210 of the console 200 display a symptom input screen 300 (refer to FIG. 3) for inputting a failure symptom, and stores the failure symptom input from the input unit 220 through the symptom input screen 300 in a management state section 180 in the memory. The symptom input screen 300 includes a symptom selection box 310, a symptom input box 320, and an OK button 330. The symptom selection box 310 provides a function of selecting a relevant symptom from among a plurality of predetermined failure symptoms. The symptom input box 320 provides a function of directly inputting a symptom when a relevant symptom is not found in the symptom selection box 310. The OK button 330 has a function of confirming the symptom input through the symptom selection box 310 or the symptom input through the symptom input box 320 and notifying the failure management apparatus 100 of the symptom. Note that the symptom selection box 310 may allow stepwise selection to be made through classification of symptoms first into general categories and then into more detailed categories. The management state section 180 contains a record that associates the symptom of a failure, rejected hypotheses for rejecting a cause hypothesis which was not the cause of the failure, and the cause of the failure with one another, as illustrated in FIG. 4. The rejected hypothesis is an example of the second cause of the negative judgment result of the cause in the failure.

The instance retrieving unit 130 searches the DB 110 for the failure instances 110A in accordance with the failure symptom input through the symptom input unit 120, and stores the failure instances 110A retrieved from the DB 110 in an instance retrieval result section 190 in the memory. Referring to FIG. 5, the instance retrieval result section 190 contains records which have the same data structure as the failure instances 110A (FIG. 2). Here, the memory that stores the instance retrieval result section 190 is an example of storage means.

Figure 6:
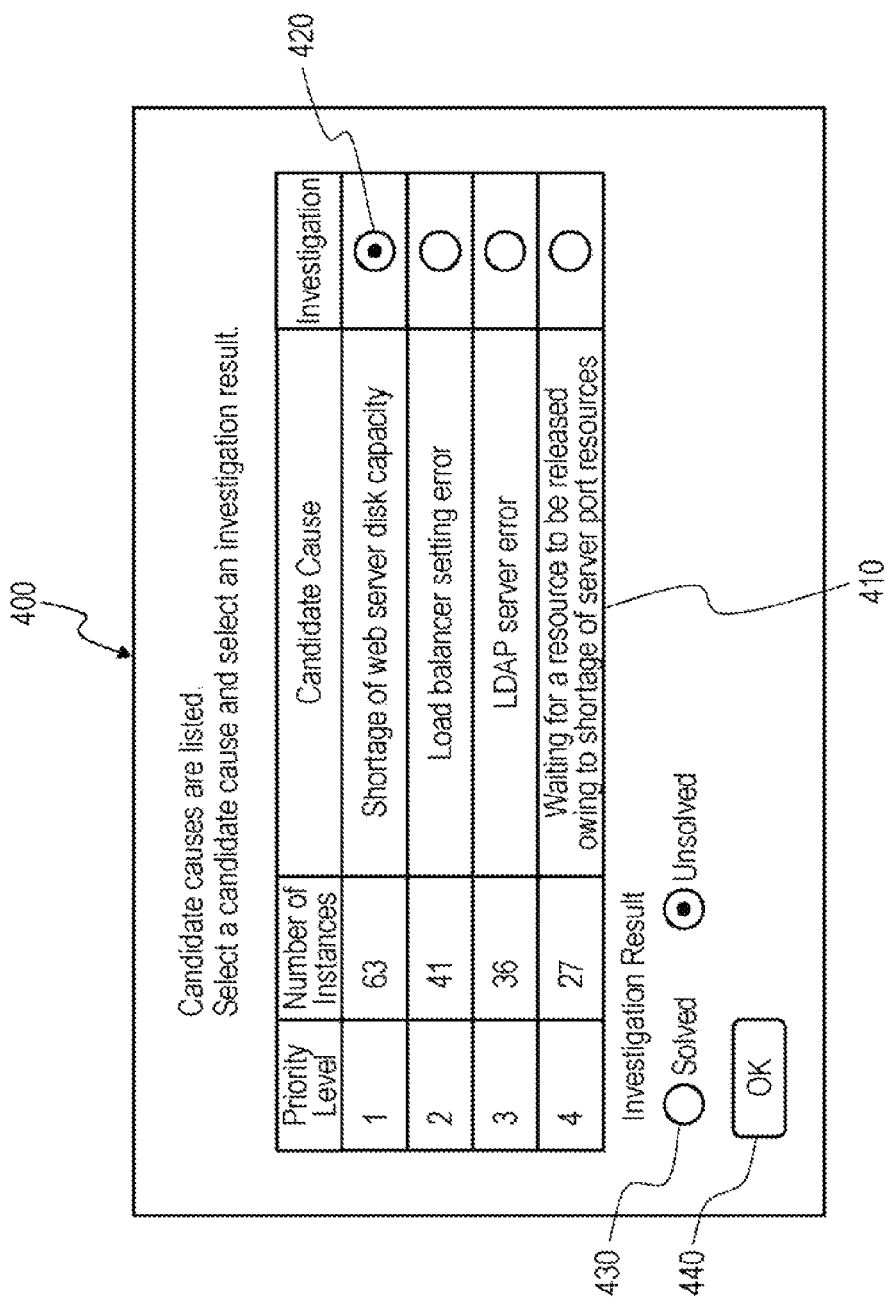
FIG. 6 is an explanatory diagram illustrating a candidate cause listing screen.

The candidate cause presenting unit 140, by referring to the instance retrieval result section 190, displays a candidate cause listing screen 400 on the display unit 210 of the console 200, as illustrated in FIG. 6. The candidate cause listing screen 400 includes a list display section 410, a candidate cause selection section 420, an investigation result selection section 430, and an OK button 440. The list display section 410 includes a priority level, the number of instances, and a candidate cause. The candidate cause selection section 420 selects the investigated candidate cause. The investigation result selection section 430 selects whether or not the failure has been solved. The OK button 440 confirms the content of the selection. The candidate cause selection section 420 and the investigation result selection section 430 are preferably radio buttons to facilitate the selection. The OK button 440 also provides a function of notifying the failure management apparatus 100 of the content of the selection.

When "Not solved" has been selected in the investigation result selection section 430 of the candidate cause listing screen 400, the rejected hypothesis input unit 150 stores the candidate cause in the management state section 180 as a rejected hypothesis to hold information indicating that the candidate cause selected by the candidate cause selection section 420 has been rejected.

The co-occurrence relation calculation unit 160 narrows down (extracts) the failure instances 110A stored in the instance retrieval result section 190 by referring to the rejected hypotheses of the management state section 180. Note that the details of how to narrow down the failure instances 110A will be described later.

When "Solved" has been selected in the investigation result selection section 430 of the candidate cause listing screen 400, the cause input unit 170 stores the candidate cause selected by the candidate cause selection section 420 in the management state section 180 as the cause so as to make the candidate cause be the cause of the failure. Further, the cause input unit 170 appropriately stores the record stored in the management state section 180 in the DB 110 so as to make the record be utilized as a new failure instance of the failure instances 110A.

Now, the processing performed by the symptom input unit 120, the instance retrieving unit 130, the candidate cause presenting unit 140, the rejected hypothesis input unit 150, the co-occurrence relation calculation unit 160 and the cause input unit 170 will be described. Note that the symptom input unit 120 and the instance retrieving unit 130 perform an exemplary retrieving step and are exemplary retrieval means. The candidate cause presenting unit 140 performs an exemplary presenting step and is exemplary presenting means. The rejected hypothesis input unit 150 and the co-occurrence relation calculation unit 160 perform an exemplary narrowing step and are exemplary narrowing means. The cause input unit 170 performs an exemplary adding step.

Figure 7:
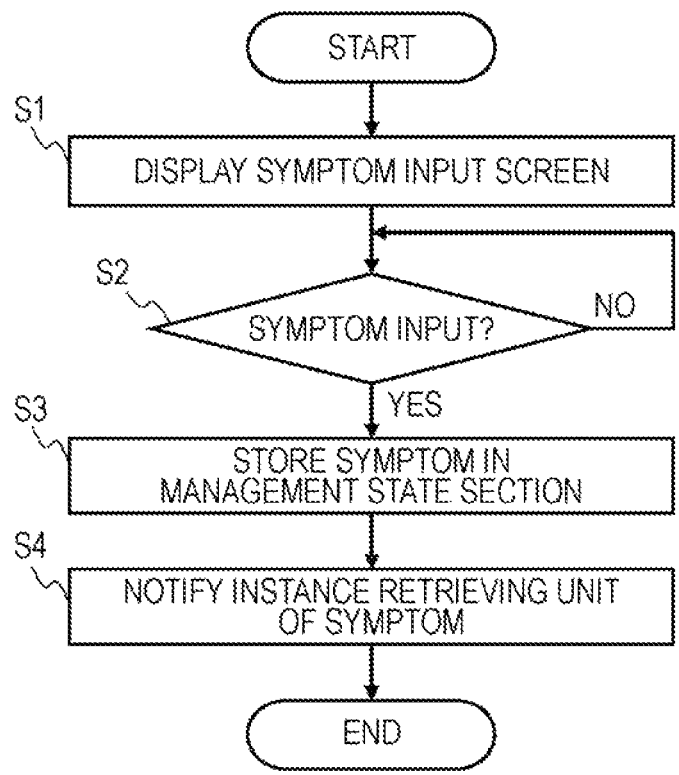
FIG. 7 is a flowchart illustrating symptom input processing performed by a symptom input unit.

FIG. 7 illustrates symptom input processing performed by the symptom input unit 120 upon receipt of an explicit instruction from the console 200.

In step S1, the symptom input unit 120 makes the display unit 210 of the console 200 display the symptom input screen 300 as illustrated in FIG. 3.

In step S2, the symptom input unit 120 determines whether or not a failure symptom has been input on the basis of whether or not a failure symptom notification has been received from the console 200. When it is determined that a failure symptom has been input, the symptom input unit 120 proceeds to step S3 (Yes), and when it is determined that a failure symptom has not been input, the symptom input unit 120 repeats the processing of step S2 (No).

In step S3, the symptom input unit 120 stores a failure symptom input through the symptom input screen 300 in the management state section 180 as a symptom.

In step S4, the symptom input unit 120 notifies the instance retrieving unit 130 of the failure symptom.

Figure 8:
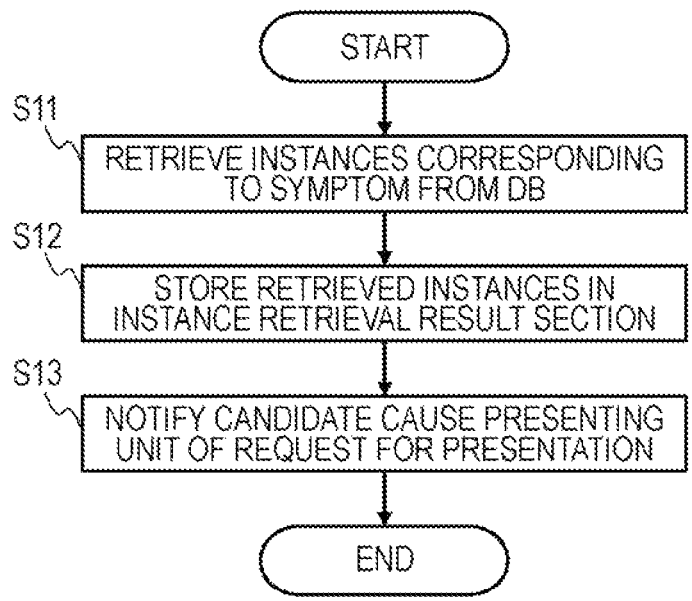
FIG. 8 is a flowchart illustrating instance retrieving processing performed by an instance retrieving unit.

FIG. 8 illustrates instance retrieving processing performed by the instance retrieving unit 130 upon receipt of a notification of a failure symptom from the symptom input unit 120.

In step S11, the instance retrieving unit 130 searches the DB 110 for the failure instances 110A corresponding to the failure.

In step S12, the instance retrieving unit 130 stores the failure instances 110A retrieved from the DB 110 in the instance retrieval result section 190.

In step S13, the instance retrieving unit 130 notifies the candidate cause presenting unit 140 of a request for presenting a list of candidate causes.

Figure 9:
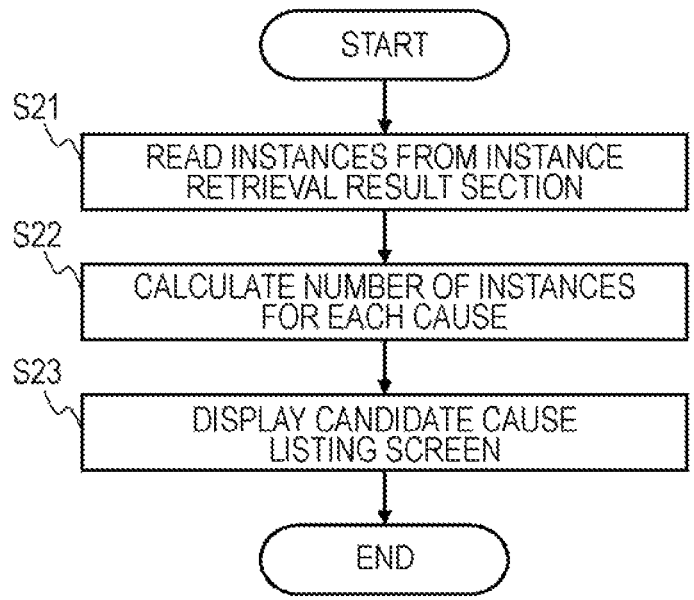
FIG. 9 is a flowchart illustrating candidate cause outputting processing performed by a candidate cause presenting unit.

FIG. 9 illustrates candidate cause outputting processing performed by the candidate cause presenting unit 140 upon receipt of a request for presentation from the instance retrieving unit 130 or the co-occurrence relation calculation unit 160.

In step S21, the candidate cause presenting unit 140 reads all of the failure instances 110A by referring to the instance retrieval result section 190.

In step S22, the candidate cause presenting unit 140 calculates the number of instances for each of the causes, for the failure instances 110A read from the instance retrieval result section 190.

In step S23, the candidate cause presenting unit 140 makes the display unit 210 of the console 200 display the candidate cause listing screen 400 as illustrated in FIG. 6. Here, candidate causes are outputting on the candidate cause listing screen 400 in descending order of the number of instances, through reordering. Note that the candidate cause presenting unit 140 may make only the candidate cause with the highest priority level be displayed.

Figure 10:
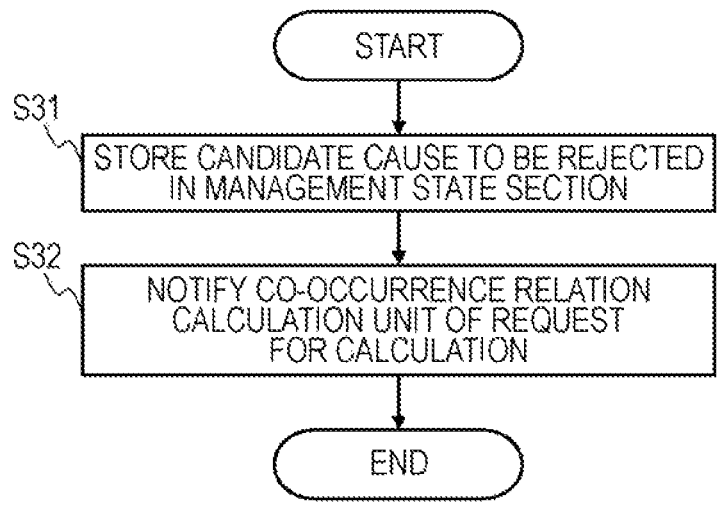
FIG. 10 is a flowchart illustrating rejected hypothesis input processing performed by a rejected hypothesis input unit.

FIG. 10 illustrates rejected hypothesis input processing performed by the rejected hypothesis input unit 150 upon confirmation of the candidate cause to be rejected and confirmation of the fact that the failure remains unsolved, on the candidate cause listing screen 400.

In step S31, the rejected hypothesis input unit 150 stores the candidate cause to be rejected in the management state section 180 as a rejected hypothesis. Here, when another candidate cause has already been stored in the management state section 180 as a rejected hypothesis, the rejected hypothesis input unit 150 stores the candidate cause to be rejected in a blank field following the already stored candidate cause.

In step S32, the rejected hypothesis input unit 150 notifies the co-occurrence relation calculation unit 160 of a request for calculation of a co-occurrence relation.

Figure 11:
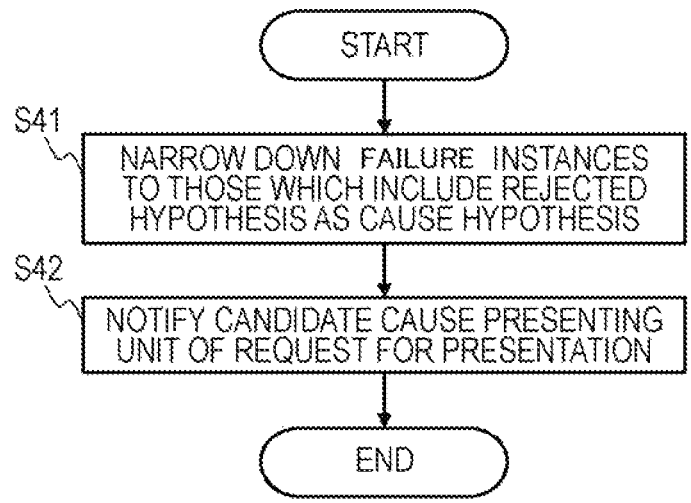
FIG. 11 is a flowchart illustrating co-occurrence relation calculation processing performed by a co-occurrence relation calculation unit.

FIG. 11 illustrates co-occurrence relation calculation processing performed by the co-occurrence relation calculation unit 160 upon receipt of a request for calculation from the rejected hypothesis input unit 150.

In step S41, by referring to the management state section 180 and the instance retrieval result section 190, the co-occurrence relation calculation unit 160 narrows down the failure instances 110A stored in the instance retrieval result section 190 to those which include the rejected hypothesis as a cause hypothesis. Here, the failure instances 110A which were not included in the narrowed down failure instances are removed from the instance retrieval result section 190 by the co-occurrence relation calculation unit 160.

In step 42, the co-occurrence relation calculation unit 160 notifies the candidate cause presenting unit 140 of a request for outputting a list of candidate causes.

Figure 12:
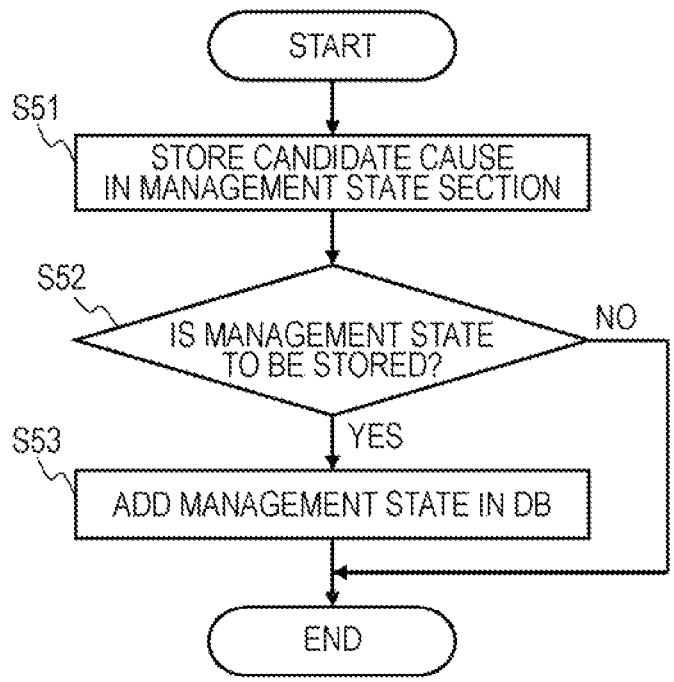
FIG. 12 is a flowchart illustrating cause input processing performed by a cause input unit.

FIG. 12 illustrates cause input processing performed by the cause input unit 170 upon confirmation of the cause of a failure on the candidate cause listing screen 400.

In step 51, the cause input unit 170 stores the candidate cause which was the cause of the failure in the management state section 180 as the cause.

In step S52, the cause input unit 170 determines whether or not the record of the management state section 180 is to be stored in the DB 110. In other words, as described before, the failure instances 110A stored in the DB 110 need to be those in which the co-occurrence relations between the cause hypotheses and the cause are described. When the management state is stored by an operation manager with insufficient skills to isolate the cause, the failure instances 110A in which the co-occurrence relations between the cause hypotheses and the cause are not described may be stored in the DB 110. Hence, by registering, in advance, operation managers for whom there is no failure in storing the record of the management state section 180 in the DB 110, the cause input unit 170 determines whether or not the record of the management state section 180 is to be stored in the DB 110 in accordance with whether or not the operation manager identified by the log-in information has been registered. When it is determined that the record of the management state section 180 is to be stored, the flow proceeds to step S53 (Yes), where the cause input unit 170 adds the record of the management state section 180 to the DB 110. On the other hand, when the cause input unit 170 determines that the record of the management state section 180 is not to be stored, the processing ends (No).

According to the failure management apparatus 100 described above, when a failure symptom of an information system is input, the DB 110 is searched for the failure instances 110A corresponding to the failure. Then the number of instances is calculated for each cause of the failure instances 110A, and candidate causes are outputted together with the respective numbers of instances and priority levels which are assigned in accordance with the numbers of instances. Here, since the candidate causes are presented in descending order of the numbers of instances, through reordering, the candidate cause at the top is likely to be the cause of the failure, thereby helping an operation manager isolate the cause. Further, since each candidate cause is outputted together with the number of instances thereof, the number of instances can be used as an indicator for determining which candidate cause is to be preferentially investigated.

After the candidate causes have been outputted, when a candidate cause to be rejected is input, the failure instances 110A retrieved from the DB 110 are narrowed down to those in which the candidate cause to be rejected is stored as the cause hypothesis. In other words, since the co-occurrence relations between the cause hypotheses and the cause are described in the failure instances 110A, the failure instances 110A are narrowed down on the basis of the fact that "if this cause hypothesis is wrong, this is thought to be the cause". At this time, since the failure instances 110A to be narrowed down are in the memory, the time desirable to narrow down the failure instances 110A is reduced. Then the number of instances is calculated for each cause of the failure instances 110A, and the candidate causes are outputted together with the respective numbers of instances and priority levels assigned in accordance the numbers of instances. Accordingly, the causes of the failure may be efficiently investigated using the knowledge of operation managers who have high skills to isolate the cause.

When a cause is input after the candidate causes have been outputted, the management state, from the input of the failure symptom to the input of the cause, is added to the DB 110. Hence, the failure instances 110A are increased in number, whereby accuracy of outputting the candidate causes and narrowing down of the candidate causes is increased. At this time, since the management state of an operation manager having low skills to isolate the cause of a failure is not stored in the DB 110, the failure instance 110A in which the co-occurrence relations between the candidate causes and the cause are not described is prevented from being stored in the DB 110.

Since the failure instances 110A corresponding to a failure symptom are narrowed down stepwise using the co-occurrence relations between the cause hypotheses and the cause, there is no need to investigate all of the candidate causes of a failure, whereby the time desirable to recover from the failure is decreased. Further, since candidate causes to be investigated are outputted stepwise, efficient recovery from the failure is realized irrespective of the skills desirable to isolate the cause of the failure, which is also useful for the education of operation managers.

Here, to make it easy to understand the operation and advantages of the failure management apparatus 100, how to manage a failure of an information system, assuming a specific embodiment, will be described. As a precondition, the failure instances 110A illustrated in FIG. 2 are assumed to be stored in the DB 110.

Figure 13:
FIG. 13 is an explanatory diagram illustrating a management state section where the symptom of a failure has been stored.

When an operation manager enters a failure "Connection with a client is intermittent", "Connection with a client is intermittent" is stored in the management state section 180 as a symptom, as illustrated in FIG. 13. In addition, the DB 110 is searched for the failure instances 110A containing "Connection with a client is intermittent" as a symptom, and the retrieved failure instances 110A are stored in the instance retrieval result section 190, as illustrated in FIG. 14. Then, the number of instances are calculated for each cause of the failure instances 110A stored in the instance retrieval result section 190, and the candidate cause listing screen 400 illustrated in FIG. 15 is displayed.

Figure 16:
FIG. 16 is an explanatory diagram illustrating a management state section where a rejected hypothesis [1] has been stored.

When the operation manager enters a rejected hypothesis "Shortage of web server disk capacity" through the candidate cause listing screen 400, "Shortage of web server disk capacity" is stored in the management state section 180 as a rejected hypothesis [1], as illustrated in FIG. 16. Further, by referring to the instance retrieval result section 190 illustrated in FIG. 14, narrowing down is performed to the failure instances 110A each containing "Shortage of web server disk capacity" as a cause hypothesis, that is, the failure instances 110A identified by the IDs 3, 5, and 7, as illustrated in FIG. 17. Then, the number of instances are again calculated for each cause of the failure instances 110A stored in the instance retrieval result section 190, and the candidate cause listing screen 400 illustrated in FIG. 18 is displayed.

Figure 19:
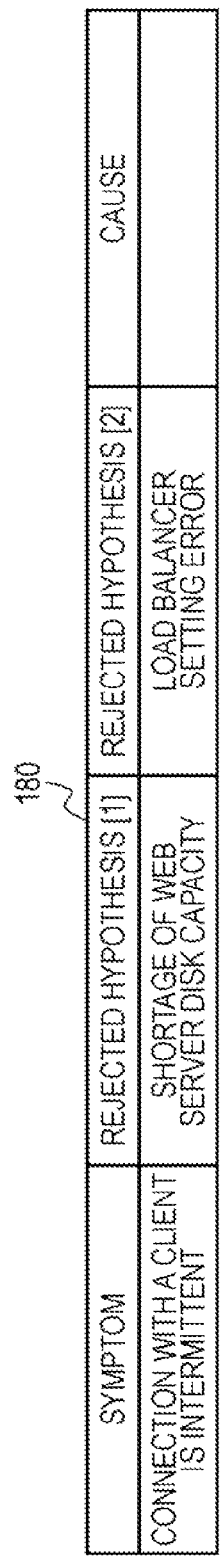
FIG. 19 is an explanatory diagram illustrating a management state section where a rejected hypothesis [2] has been stored.
Figure 20:
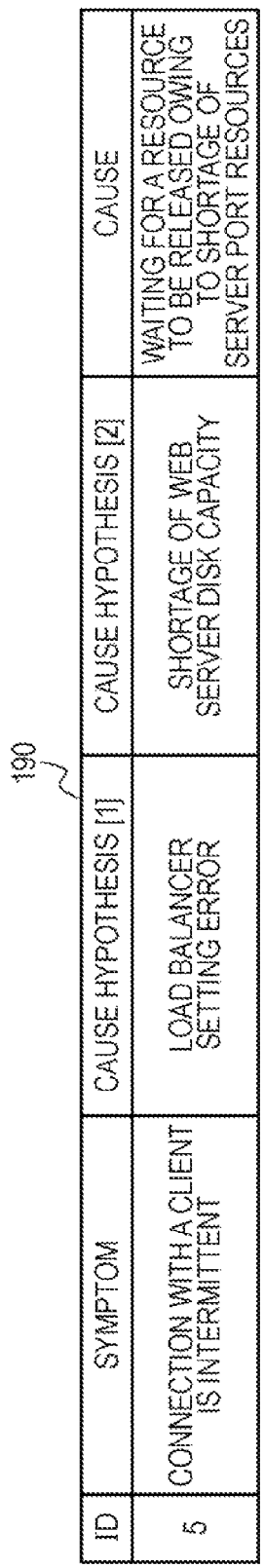
FIG. 20 is an explanatory diagram illustrating an instance retrieval result section where failure instances have been further narrowed down.

When the operation manager enters a rejected hypothesis "Load balancer setting error" through the candidate cause listing screen 400, "Load balancer setting error" is stored in the management state section 180 as a rejected hypothesis [2], as illustrated in FIG. 19. Further, by referring to the instance retrieval result section 190 illustrated in FIG. 17, narrowing down is performed to the failure instance 110A containing "Shortage of web server disk capacity" and "Load balancer setting error" as cause hypotheses, that is, the failure instance 110A identified by the ID 5, as illustrated in FIG. 20. Then, the number of instances are again calculated for each cause of the failure instances 110A stored in the instance retrieval result section 190, and the candidate cause listing screen 400 illustrated in FIG. 21 is displayed.

When the operation manager enters a cause "Waiting for a resource to be released owing to shortage of server port resources" through the candidate cause listing screen 400, "Waiting for a resource to be released owing to shortage of server port resources" is stored in the management state section 180 as the cause, as illustrated in FIG. 22. In addition, the record of the management state section 180 is added to the DB 110 as the failure instance 110A with an ID assigned thereto, as illustrated in FIG. 23.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiment of the present invention has been described in detail, it should be understood that the various changes, substitutions, and alterations could be made hereto without departing from the spirit and scope of the invention.

What is claimed is:

1. A method of estimating a candidate cause in a failure occurred in an information processing apparatus by a computer, the method comprising:

retrieving, by the computer, a first set of incident information from a data storage region on the basis of failure symptom data which is set on the computer, the data storage region storing incident information, each piece of incident information including failure symptom data, first cause data of a positive judgment result of a cause in the failure, and second cause data of a negative judgment result of the cause in the failure, each of the first set including failure symptom data identical to the set failure symptom data;

extracting, by the computer, a second set of incident information from the first set on the basis of cause data which is set on the computer, each piece of the second set including the second cause data identical to the set cause data; and outputting, by the computer, the first cause data included in the second set as candidate cause data.

2. The method according to claim 1, further comprising:
storing in the data storage region, by the computer, the set failure symptom data, the first cause data and the second cause data of the second set as a piece of incident information.

3. The method according to claim 2, wherein the storing is performed in case that log-in information which is set on the computer matches registered log-in information, log-in information used for specifying a user.

4. The method according to claim 1, wherein the outputting includes outputting a respective number of incident information including identical first cause data.

5. The method according to claim 4, wherein the outputting includes outputting the first cause data in descending orders of respective numbers of incident information.

6. An apparatus for estimating a candidate cause in a failure occurred in an information processing apparatus, the apparatus comprising:

a storage configured to store incident information including failure symptom data, first cause data of a positive judgment result of a cause in the failure, and second cause data of a negative judgment result of the cause in the failure; and a processor coupled to the storage and configured to:
retrieve a first set of incident information from the storage on the basis of failure symptom data which is set on the estimating apparatus, each of the first set including failure symptom data identical to the set failure symptom data, extract a second set of incident information from the first set on the basis of cause data which is set on the estimating apparatus, each piece of the second set including the second cause data identical to the set cause data, and output the first cause data included in the second set as candidate cause data.

7. The apparatus according to claim 6, wherein the processor is configured to store in the storage, the set failure symptom data, the first cause data and the second cause data of the second set as a piece of incident information.

8. The apparatus according to claim 6, wherein when log-in information which is set on the apparatus matches registered log-in information, log-in information used for specifying a user, the processor is configured to store in the storage, the set failure symptom data, the first cause data and the second cause data of the second set as a piece of incident information.

9. The apparatus according to claim 6, wherein the processor is configured to output a respective number of incident information including identical first cause data.

10. The apparatus according to claim 9, wherein the processor is configured to output the first cause data in descending orders of respective numbers of incident information.

11. A computer-readable non-transitory medium storing a program causing a computer to execute a process for estimating a candidate cause in a failure occurred in an information processing apparatus the process comprising:

retrieving a first set of incident information from a data storage region on the basis of failure symptom data which is set on the computer, the data storage region storing incident information, each piece of incident information including failure symptom data, first cause data of a positive judgment result of a cause in the failure, and second cause data of a negative judgment result of cause in the failure, each of the first set including failure symptom data identical to the set failure symptom data;

extracting a second set of incident information from the first set on the basis of cause data which is set on the computer, each piece of the second set including the second cause data identical to the set cause data; and outputting the first cause data included in the second set as candidate cause data.

12. The computer-readable non-transitory medium according to claim 11, the process further comprising:

storing in the data storage region, the set failure symptom data, the first cause data and the second cause data of the second set as a piece of incident information.

13. The computer-readable non-transitory medium according to claim 12, wherein the storing is performed in case that log-in information which is set on the computer matches registered log-in information, log-in information used for specifying a user.

14. The computer-readable non-transitory medium according to claim 11, wherein the outputting includes outputting a respective number of incident information including identical first cause data.

15. The computer-readable non-transitory medium according to claim 14, wherein the outputting includes outputting the first cause data in descending orders of respective numbers of incident information.

\* \* \* \* \*